3,026,343
3,4 DICHLORO AMINOALKYLAMIDES

David L. Garmaise, Montreal, Quebec, and Arthur F. McKay, Beaconsfield, Quebec, Canada, assignors to Monsanto Canada Limited, La Salle, Quebec, Canada
No Drawing. Filed Oct. 5, 1960, Ser. No. 60,561
Claims priority, application Great Britain Dec. 3, 1959
8 Claims. (Cl. 260—404.5)

This invention relates to substituted aminoalkylamides and their salts, to the production thereof and to bacteriostatic compositions containing the same.

In accordance with this invention there are provided substituted aminoalkylamides of the general formula $$RNH(CH_2)_nCONHR'$$

wherein R and R' are each one of the group consisting of 3,4-dichlorobenzyl and 3,4-dichlorophenyl and wherein $n$ is an integer from 2 to 10, and the acid addition salts of said compounds.

The compounds of the foregoing general formula have been found to be potent bacteriostatic agents effective against both gram-positive and gram-negative bacteria. For example, N,N'-di-(3,4-dichlorophenyl) - 3 - aminopropionamide inhibits the growth of the following organisms at the dilutions indicated:

Staph. pyogenes (penicillin sensitive) (1:2,560,000),
Staph. pyogenes (penicillin resistant) (1:1,280,000),
Sarcina lutea (1:2,560,000),
Sterpt. faecalis (1:1,280,000),
E. coli No. 198 (1:160,000),
Aero. aerogenes (1:20,000),
S. pullorum (1:20,000),
ps. aeruginosa (1:10,000),
Pr. mirabilis (1:40,000),
Pr. vulgaris (1:40,000).

11 - (3,4-dichlorobenzylamino)-N-(3,4-dichlorophenyl) undecanoamide hydrochloride inhibits the growth of the following organisms at the dilutions indicated:

Staph. pyogenes (penicillin sensitive) (1:160,000),
Staph. pyogenes (penicillin resistant) (1:160,000),
Sarcina lutea (1:640,000),
Strept. faecalis (1:1,280,000),
E. coli No. 198 (1:320,000),
Aero. aerogenes (1:20,000),
S. pullorum (1:20,000),
Ps. aeruginosa (1:10,000),
Pr. mirabilis (1:80,000),
Pr. vulgaris (1:80,000).

By this invention there is provided a method for the preparation of N,N'-disubstituted-aminoalkylamides of the above general formula which comprises reacting a substituted amine $NH_2R'$ with an $\omega$-haloalkanoylhalide, in which the polymethylene chain contains 2 to 10 carbon atoms, for example β-chloropropionyl chloride, to yield the N-substituted ω-chloroalkanoamide as the hydrochloride salt. The hydrochloride salt may then be converted to the corresponding free aminoalkylamide.

In this invention there are provided bacteriostatic compositions comprising an aminoalkylamide of the foregoing general formula compounded in minor amount with a major amount of a carrier. The word "carrier" is used in a general sense to denote a pharmaceutically acceptable substance or substances physically compounded with the active agent to assist the active substance in effecting contact with bacteria and thus to form a product which can be used practically as a bacteriostatic agent. The composition may also contain other active constituents. The active substances of the invention are used preferably in the form of tablets for internal use and in the form of an ointment or salve for external application.

Thus, for example, one effective composition is a tablet made by mixing the active substance with a dry carrier made up of a filler, for example starch or milk sugar or both, and a lubricating agent, for example talc or stearic acid or both. These constituents are thoroughly mixed and then compressed into slugs, the slugs being subsequently ground and screened to provide granules. The granules are compressed into tablets. A conveniently effective concentration of the active substance in a tablet is generally from about 25 mg. to about 300 mg. per tablet.

A salve or ointment may be made, for example, by incorporating 2 to 10% by weight of the active substance in a water-miscible greaseless base ointment as a carrier, and mixing the product in a roller type ointment mill. This ointment can be used for topical applications in the treatment of infected skin areas.

The following examples will serve to illustrate the invention:

EXAMPLE I

*N,N'-Di-(3,4-Dichlorophenyl)-3-Aminopropionamide*

β-Chloropropionyl chloride (13.0 parts) dissolved in benzene (90 parts) was added dropwise to a stirred solution of 3,4-dichloroaniline (32.5 parts) in benzene (120 parts) at 20°–30° C. The precipitated 3,4-dichloroaniline hydrochloride was removed by filtration. The yield was 19.0 parts (95%). The filtrate was then evaporated to dryness and the residue was crystallised from ether-petroleum ether to give N-(3,4-dichlorophenyl)-3-chloropropionamide with a melting point of 108–110° C. The yield was 22.0 parts (87%). Recrystallisation from dilute ethanol raised the melting point to 110–111° C.

Analysis of this compound gave 42.81% carbon, 3.19% hydrogen, 42.12% chlorine and 5.55% nitrogen as compared with the theoretical calculated for $C_9H_8Cl_3NO$ of 42.79% carbon, 3.27% hydrogen, 42.21% chlorine and 5.50% nitrogen.

N-(3,4 - dichlorophenyl)-3-chloropropionamide (12.7 parts) was mixed with 3,4-dichloroaniline (16.2 parts) and stirred for 30 minutes at 180° C. The reaction mixture was cooled and partitioned between 5% sodium carbonate solution (500 parts) and ether (500 parts). The ether solution was dried and evaporated and the residue was steam distilled until 3,4-dichloroaniline no longer appeared in the distillate. The residue was extracted with ether (300 parts). The ether solution was then dried and evaporated and the residue was crystallized from ether-petroleum ether to give N,N'-di-(3,4-dichlorophenyl)-3-aminopropionamide with a melting point of 108–112° C. The yield was 13.5 parts (71.4%). The melting point was raised to 114.5–115.5° C. by crystallisation from dilute ethanol.

Analysis of this compound gave 47.65% carbon, 3.20% hydrogen, 37.51% chlorine and 7.41% nitrogen as compared with the theoretical calculated for $C_{15}H_{12}Cl_4N_2O$ of 47.76% carbon, 3.18% hydrogen, 37.36% chlorine and 7.25% nitrogen.

EXAMPLE II

*N,N'-Di-(3,4-Dichlorobenzyl)-3-Aminopropionamide*

β-Chloropropionyl chloride (28.7 parts) in chloroform (300 parts) was added dropwise to a stirred solution of 3,4-dichlorobenzylamine (79.5 parts) in chloroform (300 parts) at 30° C. The precipitated 3,4-dichlorobenzylamine hydrochloride was removed by filtration. The yield was 45.7 parts (95.2%). The filtrate was then evaporated and the residue was crystallised from dilute ethanol to give N-(3,4-dichlorobenzyl)-3-chloropropionamide with a melting point of 108–110° C. The yield was 32.3 parts (53.5%).

Analysis of this compound gave 45.05% carbon, 3.78% hydrogen, 39.90% chlorine and 5.26% nitrogen as compared with the theoretical calculated for $C_{10}H_{10}Cl_3NO$ of 45.05% carbon, 3.67% hydrogen, 40.10% chlorine and 5.33% nitrogen.

N - (3,4 - dichlorobenzyl) - 3 - chloropropionamide (8.0 parts) was mixed with 3,4-dichlorobenzylamine (10.6 parts) and stirred for 1 hour at 180° C. The reaction mixture was cooled and extracted successively with ether (100 parts) and boiling water (300 parts) to give N,N'-di - (3,4 - dichlorobenzyl) - 3 - aminopropionamide hydrochloride with a melting point of 251–253° C. Recrystallisation from ethanol raised the melting point to 252–253° C.

Analysis of this compound gave 46.14% carbon, 3.87% hydrogen, 40.05% chlorine and 6.33% nitrogen as compared with the theoretical calculated for $C_{17}H_{17}Cl_5N_2O$ of 46.51% carbon, 3.90% hydrogen, 40.04% chlorine and 6.41% nitrogen.

EXAMPLE III

*N,N'-Di-(3,4-Dichlorophenyl)-6-Aminocaproamide*

6 - bromocaproyl chloride (7.85 parts) in ether (65 parts) was added dropwise to a stirred solution of 3,4-dichloroaniline (12 parts) in ether (65 parts) at 5° C. The precipitated 3,4-dichloroaniline hydrochloride was removed by filtration. The filtrate was evaporated to dryness and the residue was crystallised from ether-petroleum ether to give N-(3,4-dichlorophenyl)-6-bromocaproamide with a melting point of 65–66° C. The yield was 12.3 parts (98%).

N - (3,4 - dichlorophenyl) - 6 - bromocaproamide (6.0 parts) was mixed with 3,4-dichloroaniline (4.1 parts) and stirred for 1 hour at 165° C. The reaction mixture was added to ether (80 parts) and 5% sodium carbonate solution (100 parts). The ether layer was evaporated and the residue was steam distilled until 3,4-dichloroaniline no longer appeared in the distillate. The non-volatile residue was extracted with ether (2×40 parts). The ether extract was then dried and evaporated, to give the product N,N' - di - (3,4 - dichlorophenyl) - 6 - aminocaproamide with a melting point of 125–130° C. The yield was 4.7 parts (63%). Recrystallisation from benzene raised the melting point to 131–132° C.

Analysis of this compound gave 6.62% nitrogen as compared with the theoretical calculated for $$C_{18}H_{18}Cl_4N_2O$$

of 6.67% nitrogen.

EXAMPLE IV

*6-(3,4-Dichlorobenzylamino)-N-(3,4-Dichlorophenyl)-Caproamide*

N - (3,4 - dichlorophenyl) - 6 - bromocaproamide (6.0 parts), prepared as described in Example III was mixed with 3,4-dichlorobenzylamine (4.3 parts) and stirred for 1 hour at 165° C. The reaction mixture was added to ether (80 parts) and 5% sodium carbonate solution (100 parts). The ether layer was evaporated and the residue was steam distilled until 3,4 - dichlorobenzylamine no longer appeared in the distillate. The non-volatile residue was extracted with ether (2×80 parts). Hydrogen chloride was bubbled into the dried ether extract to give 6 - (3,4 - dichlorobenzylamino) - N - (3,4 - dichlorophenyl)-caproamide hydrochloride with a melting point of 215–217° C. The yield was 3.65 parts (43%). Recrystallisation from ethanol raised the melting point to 216.5–218° C.

Analysis of this compound gave 48.31% carbon, 4.44% hydrogen, 37.54% chlorine and 5.92% nitrogen as compared with the theoretical calculated for $C_{19}H_{21}Cl_5N_2O$ of 48.48% carbon, 4.50% hydrogen, 37.67% chlorine and 5.95% nitrogen.

EXAMPLE V

*N,N'-Di-(3,4-Dichlorobenzyl)-6-Aminocaproamide*

6-bromocaproyl chloride was reacted with 3,4-dichlorobenzylamine by the method described in Example I to give N - (3,4 - dichlorobenzyl) - 6 - bromocaproamide with a melting point of 68.74° C. The yield was 44.2%. Recrystallisation from petroleum ether raised the melting point to 75–76° C.

N - (3,4 - dichlorobenzyl) - 6 - bromocaproamide was treated with 3,4-dichlorobenzylamine by the method described in Example IV to give N,N' - di - (3,4 - dichlorobenzyl) - 6 - aminocaproamide hydrochloride with a melting point of 213–215° C. The yield was 51.7%. Recrystallisation from ethanol raised the melting point to 214–215° C.

Analysis of this compound gave 49.55% carbon, 4.64% hydrogen, 36.59% chlorine and 5.49% nitrogen as compared with the theoretical calculated for $C_{20}H_{23}Cl_5N_2O$ of 49.56% carbon, 4.78% hydrogen, 36.58% chlorine and 5.78% nitrogen.

EXAMPLE VI

*N,N'-Di-(3,4-Dichlorophenyl)-11-Aminoundecanoamide*

11-bromoundecanoyl chloride (51.0 parts) dissolved in chloroform (5.0 parts) was added dropwise to a stirred solution of 3,4-dichloroaniline (58.3 parts) in chloroform (400 parts) at 20–30° C. The precipitated 3,4-dichloroaniline hydrochloride was removed by filtration. The filtrate was then evaporated to dryness and the residue was crystallised from ether-petroleum ether to give N-(3,4 - dichlorophenyl) - 11 - bromoundecanoamide with a melting point of 83–84° C. The yield was 57.0 parts (77.5%).

N - (3,4 - dichlorophenyl) - 11 - bromoundecanoamide (7.5 parts) was mixed with 3,4 - dichloroaniline (6.5 parts) and heated for 1 hour at 180° C. The reaction mixture was cooled and partitioned between 5% sodium carbonate solution (100 parts) and chloroform (150 parts). The chloroform solution was dried and evaporated. The residue was steam distilled until 3,4-dichloroaniline no longer appeared in the distillate and the residue was extracted with ether (150 parts). Anhydrous hydrogen chloride was added to the ether solution. The precipitated N,N' - di - (3,4 - dichlorophenyl) - 11 - aminoundecanoamide hydrochloride was recrystallised from ethanol with a melting point of 129–130° C. The yield was 4.6 parts (47%).

Analysis of this compound gave 52.20% carbon, 5.40% hydrogen, 33.88% chlorine, and 5.23% nitrogen as compared with the theoretical calculated for $C_{23}H_{29}Cl_5N_2O$ of 52.44% carbon, 5.55% hydrogen, 33.65% chlorine, and 5.32% nitrogen.

EXAMPLE VII

*11-(3,4-Dichlorobenzylamino)-N-(3,4-Dichlorophenyl)-Undecanoamide*

N - (3,4 - dichlorophenyl)-11-bromodecanoamide prepared as described in Example VI was treated with 3,4-dichlorobenzylamine by the method described in Example IV to give 11-(3,4-dichlorobenzylamino)-N-(3,4-dichlorophenyl)-undecanoamide hydrochloride with a melting point of 179–181° C. The yield was 54.6%. Recrystallisation from dilute ethanol raised the melting point to 184–185° C.

Analysis of this compound gave 53.43% carbon, 5.66% hydrogen, 32.65% chlorine and 5.21% nitrogen as compared with the theoretical calculated for $C_{24}H_{31}Cl_5N_2O$ of 53.31% carbon, 5.78% hydrogen, 32.79% chlorine, and 5.18% nitrogen.

The parts when used in this application means parts by weight.

What is claimed:
1. Compounds represented by the formula:

$$RNH(CH_2)_nCONHR'$$

wherein R and R' are each one of the group consisting of 3,4-dichlorobenzyl and 3,4-dichlorophenyl and $n$ is an integer from 2 to 10, and their hydrochloride salts.

2. N,N' - di-(3,4 - dichlorophenyl)-3-aminopropionamide.

3. N,N' - di - (3,4 - dichlorobenzyl)-3-aminopropionamide.

4. N,N' - di - (3,4 - dichlorophenyl) - 6 - aminocaproamide.

5. 6 - (3,4 - dichlorobenzylamino) - N - (3,4-dichlorophenyl)-caproamide.

6. N,N' - di - (3,4 - dichlorobenzyl)-6-aminocaproamide.

7. N,N'-di-(3,4-dichlorophenyl - 11 - aminoundecanoamide.

8. 11 - (3,4 - dichlorobenzylamino)-N-(3,4-dichlorophenyl)-undecanoamide.

References Cited in the file of this patent
UNITED STATES PATENTS
2,678,948    Bruce et al. _____ May 18, 1954